(12) United States Patent
Boyle

(10) Patent No.: US 7,180,010 B1
(45) Date of Patent: Feb. 20, 2007

(54) ADJUSTABLE SERVICE ENTRANCE HEAD (ELECTRICAL)

(76) Inventor: Sean Boyle, 30 S. Durham St., Baltimore, MD (US) 21231

( * ) Notice: Subject to any disclaimer, the term of this patent is extended or adjusted under 35 U.S.C. 154(b) by 172 days.

(21) Appl. No.: 10/966,479

(22) Filed: Oct. 15, 2004

(51) Int. Cl.
*H02G 3/04* (2006.01)

(52) U.S. Cl. .................. 174/480; 174/481; 174/650; 174/657; 174/662; 174/668; 174/50; 248/906; 439/535

(58) Field of Classification Search .............. 174/48, 174/49, 65 R, 65 G, 50, 480, 481, 650–669; 220/3.2, 3.8, 3.7; 248/906; 439/535
See application file for complete search history.

(56) References Cited

U.S. PATENT DOCUMENTS 2,297,862 A * 10/1942 Bachmann ............... 220/3.6
3,995,102 A    11/1976 Kohaut
4,876,414 A    10/1989 Johnson
5,932,844 A *   8/1999 MacAller et al. ......... 174/65 R
6,186,838 B1    2/2001 Foster

* cited by examiner

*Primary Examiner*—Dhiru R. Patel

(57) ABSTRACT

An adjustable electrical service entrance head device for minimizing a negative aesthetic impact of the electrical service cable or conduit assembly against the structure. The adjustable electrical service entrance head device includes a housing and a clamp member. The housing preferably has an upper portion and a lower portion. The upper portion defines an interior space substantially closable from an external environment. The housing is operationally coupleable to a structure. The clamp member is preferably operationally coupleable to the lower portion, and selectively receives an electrical service cable or conduit assembly. The clamp member is variably positionable referenced to the lower portion to facilitate routing the electrical service cable or conduit assembly to minimize a negative aesthetic impact of the electrical service cable or conduit assembly against the structure.

9 Claims, 2 Drawing Sheets

ADJUSTABLE SERVICE ENTRANCE HEAD (ELECTRICAL)

I. BACKGROUND OF THE INVENTION

The present invention relates to service entrances for structures and more particularly pertains to a new adjustable electrical service entrance head device to minimize a negative aesthetic impact of the electrical service cable or conduit assembly against the structure.

II. DESCRIPTION OF THE PRIOR ART

The use of service entrance devices is known in the prior art. Illustrative examples include: U.S. Pat. No. 3,995,102; U.S. Pat. No. 4,876,414; and U.S. Pat. No. 6,186,838.

While these devices fulfill their respective, particular objectives and requirements, the need remains for a device that safely secures an electrical service cable or conduit assembly being routed into a structure while minimizing a negative aesthetic impact of the electrical service cable or conduit assembly against the structure.

III. SUMMARY OF THE INVENTION

The present invention may be produced from cast aluminum and plastic materials and would be irregular in shape, being rounded and wide at the top with a semicircular lower section. The overall dimensions of the assembly would be 4" (four inches) in height, 4" (four inches) in width, and 3" (three inches) in depth. The device would be used to route electrical power wires from an overhead utility line into a service disconnect, or other device, with single-conductor cable in conduit or with multi-conductor Type SE cable. The upper part of this device would be equipped with a split, plastic insulator made from phenolic (phenol-formaldehyde) resins. Phenolic plastics are hard, strong, inexpensive to produce, and they possess excellent electrical resistance. The new service cable or conduit wires (line side) would be routed through a short length of pipe up from the base and secured in place with an "adjustable" clamp to the lower portion. The service wires would then continue through the upper portion and out of the insulators to open air for a specified distance for conduition. This allows for conventional mid-air bugged splices made by the local utility companies and other contractors who supply the overhead power line(s) the structure.

The pipe is retained in place by a clamp which could be removed and repositioned to allow the cable or conduit to be swiveled to the left or right. The pipe could be swiveled to the left or right for a maximum of 90 degrees, enabling users to configure the routing of the wires to conform to the roof line of a house or other structure for a neat and aesthetically pleasing installation.

To this end, the present invention generally comprises a housing and a clamp member. Preferably, the housing has an upper portion and a lower portion. The upper portion defines an interior space substantially closable from an external environment. The housing is operationally coupleable to a structure. The clamp member is preferably operationally coupleable to the lower portion, and selectively receives an electrical service cable or conduit assembly. The clamp member is variably positionable referenced to the lower portion to facilitate routing the electrical service cable assembly to minimize a negative aesthetic impact of the electrical service cable or conduit assembly against the structure.

There has thus been outlined, rather broadly, the more important features of a adjustable electrical service entrance head device in order that the detailed description thereof that follows may be better understood, and in order that the present contribution to the art may be better appreciated. There are additional features of the adjustable electrical service entrance head device that will be described hereinafter and which will form the subject matter of the claims appended hereto.

In this respect, before explaining at least one embodiment of the adjustable electrical service entrance head device in detail, it is to be understood that the adjustable electrical service entrance head device is not limited in its application to the details of construction and to the arrangements of the components set forth in the following description or illustrated in the drawings. The adjustable electrical service entrance head device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present adjustable electrical service entrance head device. It is important, therefore, that the claims be regarded as including such equivalent constructions insofar as they do not depart from the spirit and scope of the present invention.

It is another object of the present invention to provide an adjustable electrical service entrance head device which has all of the advantages of the prior art and none of the disadvantages.

It is another object of the present invention to provide an adjustable electrical service entrance head device which may be easily and efficiently manufactured and marketed.

It is another object of the present invention to provide an adjustable electrical service entrance head device which is of durable and reliable construction.

It is yet another object of the present invention to provide an adjustable electrical service entrance head device which is economically affordable and available for relevant market segment of the purchasing public.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
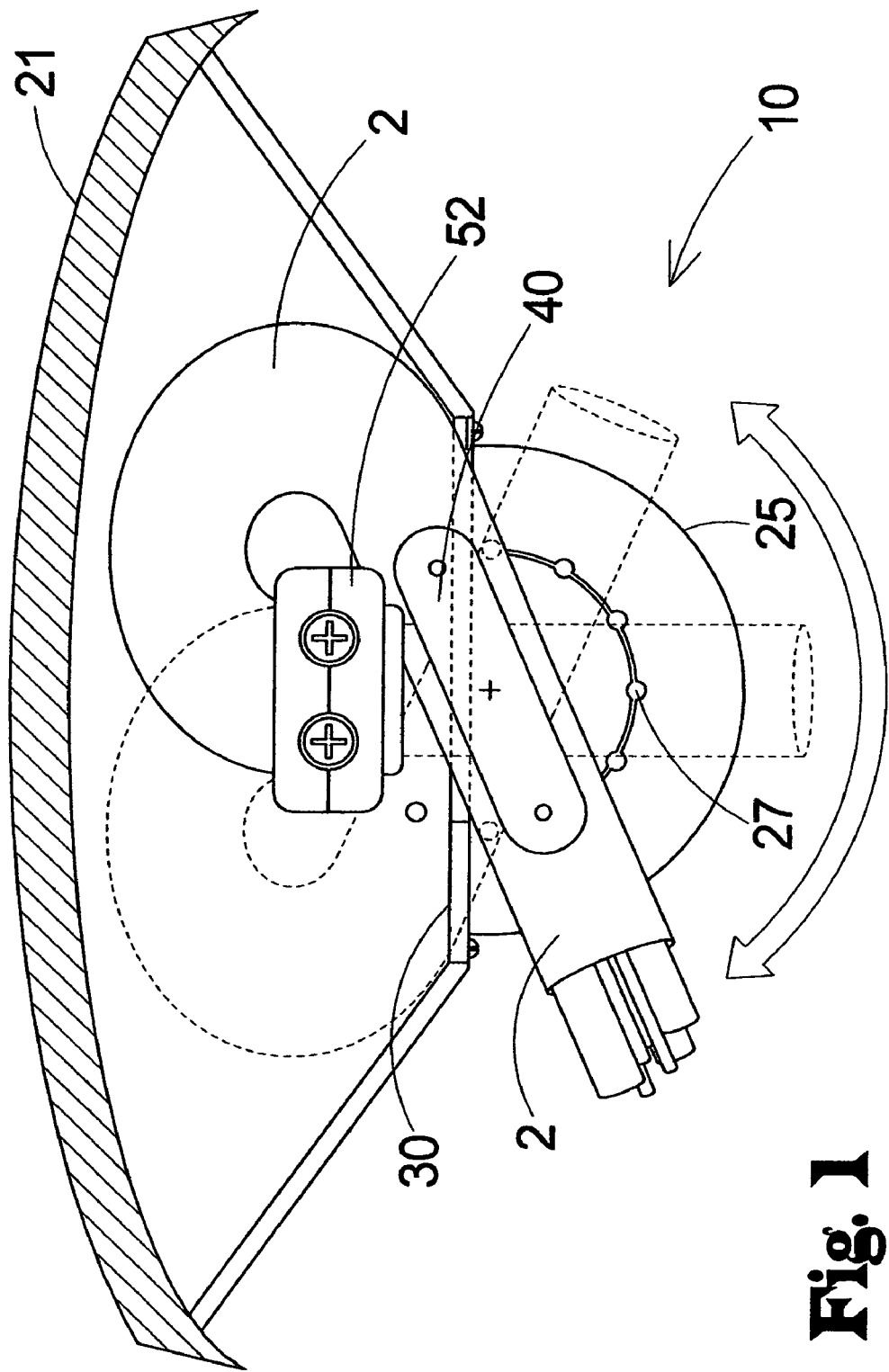
FIG. 1 is a schematic cross-sectional front view of a new adjustable electrical service entrance head device according to the present invention.
Figure 2:
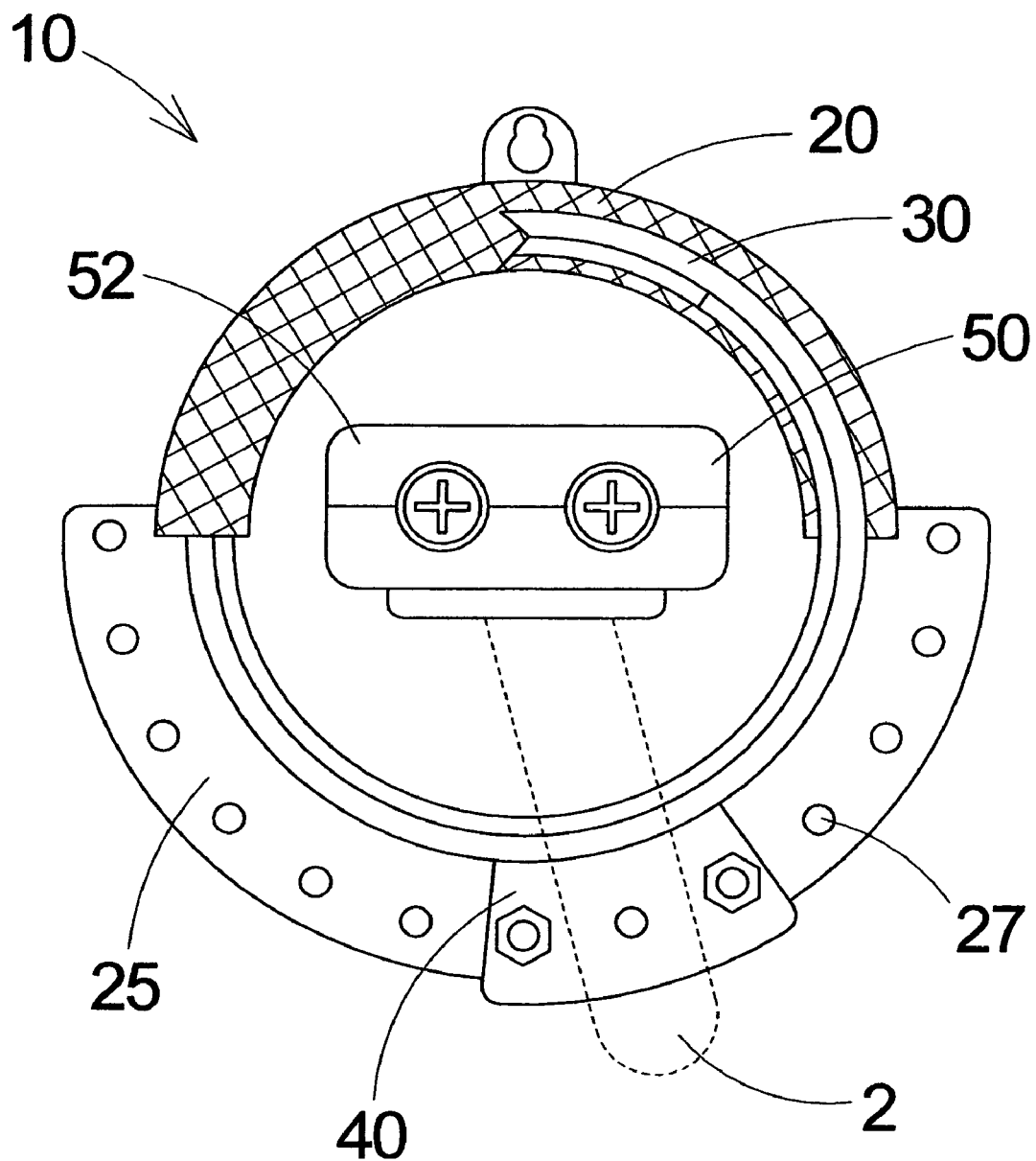
FIG. 2 is a schematic cross-sectional front view of the present invention with a rounded upper portion of the housing.

With reference now to the drawings, and in particular to FIGS. 1 through 2 thereof, a new adjustable electrical service entrance head device embodying the principles and concepts of the present invention and generally designated by the reference numeral 10 will be described.

As best illustrated in FIGS. 1 through 2, the adjustable electrical service entrance head device 10 generally comprises a housing 20 and a clamp member 40.

The housing 20 preferably has an upper portion 21 and a lower portion 25. The upper portion 21 defines an interior space substantially closable from an external environment. The housing 20 is operationally coupleable to a structure.

The clamp member 40 is preferably operationally coupleable to the lower portion 25, and selectively receives an electrical service cable or conduit assembly 2. The clamp member 40 is variably positionable referenced to the lower portion 25 to facilitate routing the electrical service cable or conduit assembly 2 to minimize a negative aesthetic impact of the electrical service cable or conduit assembly 2 against the structure. As an illustrative example only, and not by way of limitation, the device 10 could be used to route an electrical service cable or conduit assembly 2 along a roof line and into the structure to minimize the visibility of the electrical service cable or conduit assembly 2.

In a preferred embodiment, the lower portion 25 is substantially semi-circular, and has a plurality of apertures 27 extending therethrough. The plurality of apertures 27 is preferably dispersed in an arcuate pattern adjacent to a perimeter of the lower portion 25.

The clamp member 40 may be mated with an associated pairing of a selected pair of the plurality of apertures 27. The clamp member 40 facilitates routing the electrical service cable or conduit assembly 2 in a desired direction referenced to the upper portion 21 when the clamp member 40 is mated with a selected pair of the plurality of apertures 27.

In at least one embodiment, the plurality of apertures 27 are dispersed to allow the clamp member 40 to position the electrical service cable or conduit assembly within ninety degrees left or right of plumb as referenced to the upper portion 21.

More preferably, the plurality of apertures 27 are dispersed to allow the clamp member 40 to position the electrical service cable or conduit assembly within ninety degrees left or right of plumb as referenced to the upper portion 21.

A cover member 30 may be operationally coupled to the housing 20 adjacent to a union of the upper portion 21 and the lower portion 25. The cover member 30 selectively closes the upper portion 21 from the external environment when the electrical service cable or conduit assembly 2 is routed through the lower portion 25 of the housing 20 into the upper portion 21 of the housing 20.

An insulator assembly 50 may be positioned within the upper portion 21 of the housing 20 for selectively securing the electrical service cable or conduit assembly 2 to the upper portion 21. Preferably, the insulator assembly 50 further comprises a split phenolic insulator 52.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable electrical service entrance head device comprising:

a housing having an upper portion and a lower portion, said upper portion defining an interior space substantially closable from an external environment, said housing being operationally coupleable to a structure, and a clamp member operationally coupleable to said lower portion, said clamp member selectively receiving an electrical service cable or conduit assembly, said clamp member being variable positionable referenced to said lower portion to facilitate routing the electrical service cable or conduit assembly to minimize a negative aesthetic impact of the electrical service cable or conduit assembly against the structure, wherein the lower portion is substantially semi-circular and having a plurality of apertures extending therethrough, the plurality of apertures being dispersed in an arcuate pattern, and wherein the clamp member is mateable with an associated pairing of a selected pair of the plurality of apertures, the clamp member routing the electrical service cable or conduit assembly in a desired direction referenced to the upper portion when the clamp member is mated with a selected pair of the plurality of apertures.

2. The device of claim 1, further wherein said plurality of apertures are adjacent to a perimeter of said lower portion.

3. The device of claim 2, wherein said plurality of apertures are dispersed to allow said clamp member to position the electrical service cable or conduit assembly within ninety degrees left or right of plumb as referenced to said upper portion.

4. The device of claim 1 wherein the device further comprises a cover member operationally coupleable to said housing adjacent to a union of said upper portion and said lower portion, said cover member selectively closing said upper portion from the external environment when the electrical service cable or conduit assembly is routed through said lower portion of said housing.

5. The device of claim 1 wherein the device further comprises an insulator assembly positioned within said upper portion of said housing, said insulator assembly selectively securing at least one conductor from the electrical service cable or conduit assembly to said upper portion.

6. The device of claim 5, wherein said insulator assembly further comprises at least one phenolic insulator.

7. The device of claim 1 wherein the device further comprises an insulator assembly positioned within said upper portion of said housing, said insulator assembly selectively securing the electrical service cable assembly to said upper portion.

8. The device of claim 7, wherein said insulator assembly further comprises a split phenolic insulator.

9. An adjustable electrical service entrance head device comprising:

a housing having an upper portion and a lower portion, said upper portion defining an interior space substantially closable from an external environment, said housing being operationally coupleable to a structure, a clamp member operationally coupleable to said lower portion, said clamp member selectively receiving an electrical service cable or conduit assembly, said clamp member being variably positionable referenced to said lower portion to facilitate routing the electrical service cable or conduit assembly to minimize a negative aesthetic impact of the electrical service cable or conduit assembly against the structure, wherein said lower portion is substantially semi-circular, said lower portion having a plurality of apertures extending therethrough, said plurality of apertures being dispersed in an arcuate pattern adjacent to a perimeter of said lower portion, further wherein said clamp member being mateable with an associated pairing of a selected pair of said plurality of apertures, said clamp member routing the electrical service cable or conduit assembly in a desired direction referenced to said upper portion when said clamp member is mated with a selected pair of said plurality of apertures, further wherein said plurality of apertures being dispersed to allow said clamp member to position the electrical service cable or conduit assembly within ninety degrees left or right of plumb as referenced to said upper portion, a cover member operationally coupleable to said housing adjacent to a union of said upper portion and said lower portion, said cover member selectively closing said upper portion from the external environment when the electrical service cable or conduit assembly is routed through said lower portion of said housing, an insulator assembly positioned within said upper portion of said housing, said insulator assembly selectively securing the electrical service cable or conduit assembly to said upper portion, and wherein said insulator assembly further comprises a split phenolic insulator.

* * * * *